United States Patent
Sawarkar (10) Patent No.: US 11,847,544 B2
(45) Date of Patent: Dec. 19, 2023

(54) PREVENTING DATA LEAKAGE IN AUTOMATED MACHINE LEARNING

(71) Applicant: International Business Machines Corporation, Armonk, NY (US)

(72) Inventor: Kunal Sawarkar, Franklin Park, NJ (US)

(73) Assignee: International Business Machines Corporation, Armonk, NY (US)

( * ) Notice: Subject to any disclaimer, the term of this patent is extended or adjusted under 35 U.S.C. 154(b) by 688 days.

(21) Appl. No.: 16/934,920

(22) Filed: Jul. 21, 2020

(65) Prior Publication Data

US 2022/0027794 A1    Jan. 27, 2022

(51) Int. Cl.
| | |
|---|---|
| *G06N 20/10* | (2019.01) |
| *G06F 17/18* | (2006.01) |
| *G06F 18/22* | (2023.01) |
| *G06F 18/24* | (2023.01) |

(52) U.S. Cl.
CPC .......... *G06N 20/10* (2019.01); *G06F 17/18* (2013.01); *G06F 18/22* (2023.01); *G06F 18/24* (2023.01)

(58) Field of Classification Search
CPC ......... G06N 20/10; G06F 18/22; G06F 18/24; G06F 17/18
See application file for complete search history.

(56) References Cited

U.S. PATENT DOCUMENTS

| | | |
|---|---|---|
| 8,566,373 B2 | 10/2013 | Hao et al. |
| 9,015,849 B1 | 4/2015 | Bezbaruah et al. |

(Continued)

FOREIGN PATENT DOCUMENTS

| | | |
|---|---|---|
| CN | 108664801 A | 10/2018 |
| CN | 109754089 A | 5/2019 |

(Continued)

OTHER PUBLICATIONS

Liu et al., "A Leave-One-Feature-Out Wrapper Method for Feature Selection in Data Classification," 2013 6th International Conference on Biomedical Engineering and Informatics (BMEI 2013) (Year: 2013).*

(Continued)

*Primary Examiner* — Miranda M Huang
*Assistant Examiner* — Yao David Huang
(74) *Attorney, Agent, or Firm* — Stephen J. Walder, Jr.; Matt Zehrer (57) ABSTRACT

A mechanism is provided in a data processing system for preventing data leakage in automated machine learning. The mechanism receives a data set comprising a label for a target variable for a classifier machine learning model and a set of features. For each given feature in the set of features, the mechanism trains a subprime classifier model using the given feature as a target variable and remaining features as independent input features, tests the subprime classifier model, and records results of the subprime classifier model. The mechanism performs statistical analysis on the recorded results to identify an outlier result corresponding to an outlier subprime classifier model. The mechanism identifies a outlier feature within the set of features corresponding to the subprime classifier model, removes the identified outlier feature from the set of features to form a modified set of features, and trains the classifier machine learning model using the label for the target variable and the modified set of features.

20 Claims, 7 Drawing Sheets

(56) References Cited

U.S. PATENT DOCUMENTS

| | | | |
|---|---|---|---|
| 10,447,560 B2 | 10/2019 | Huang et al. | |
| 10,482,079 B2 | 11/2019 | Ahire | |
| 10,558,627 B2 | 2/2020 | Cassidy et al. | |
| 2009/0271338 A1* | 10/2009 | Chidlovskii | G06F 16/906 |
| | | | 706/12 |
| 2017/0293595 A1 | 10/2017 | Malleron et al. | |
| 2018/0060738 A1* | 3/2018 | Achin | G06N 20/00 |
| 2018/0260733 A1* | 9/2018 | Abado | G06N 20/00 |

FOREIGN PATENT DOCUMENTS

| | | |
|---|---|---|
| CN | 110503184 A | 11/2019 |
| CN | 111047051 A | 4/2020 |
| CN | 109347833 B | 5/2020 |
| WO | WO2019/105189 A1 | 6/2019 |

OTHER PUBLICATIONS

Feng et al., "Efficient Leave-One-Out Strategy for Supervised Feature Selection," Tsinghua Science and Technology, ISSN 1007-0214 09/10 pp. 629-635, vol. 18, No. 6, Dec. 2013 (Year: 2013).*

Velasco et al., "Importance of Skewness and Kurtosis Statistical Tests for Outlier Detection and Elimination in Evaluation of Geochemical Reference Materials," Mathematical Geology, vol. 30, No. 1, 1998 (Year: 1998).*

Ratner, Alex et al., "Snorkel and The Dawn of Weakly Supervised Machine Learning", https://dawn.cs.stanford.edu/2017/05/08/snorkel/, May 8, 2017, 4 pages.

* cited by examiner

PREVENTING DATA LEAKAGE IN AUTOMATED MACHINE LEARNING

BACKGROUND

The present application relates generally to an improved data processing apparatus and method and more specifically to mechanisms for preventing data leakage in automated machine learning.

The process of training a machine learning (ML) model involves providing an ML algorithm (that is, the learning algorithm) with training data to learn from. The term "ML model" refers to the model artifact that is created by the training process. The training data must contain the correct answer, which is known as a target or target attribute. The learning algorithm finds patterns in the training data that map the input data attributes to the target (the answer that you want to predict), and it outputs an ML model that captures these patterns.

Automated Machine Learning (AutoML) is the process of automating the process of applying machine learning to real-world problems. AutoML covers the complete pipeline from a raw dataset to a deployable machine learning model. AutoML was proposed as an artificial intelligence-based solution to the ever-growing challenge of applying machine learning. The high degree of automation in AutoML allows non-experts to make use of machine learning models and techniques without being an expert in this field. Automating the process of applying machine learning end-to-end additionally offers the advantages of producing simpler solutions, faster creation of those solutions, and models that often outperform hand-designed models.

Automated Artificial Intelligence (AutoAI) is a variation of the automated machine learning, or AutoML, technology, which extends the automation of model building towards automation of the full life cycle of a machine learning model. AutoAI applies intelligent automation to the task of building predictive machine learning models by preparing data for training, identifying the best type of model for the given data, then choosing the features, or columns of data, that best support the problem the model is solving. Finally, automation tests a variety of tuning options to reach the best result as it generates, then ranks, model-candidate pipelines. The best performing pipelines can be put into production to process new data, and deliver predictions based on the model training. Automated Artificial Intelligence can also be applied to making sure the model does not have inherent bias and automating the tasks for continuous improvement of the model.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for preventing data leakage in automated machine learning. The method comprises receiving a data set comprising a label for a target variable for a classifier machine learning model and a set of features. The method comprises for each given feature in the set of features, training a subprime classifier model using the given feature as a target variable and remaining features within the set of features as independent input features, testing the subprime classifier model, and recording results of the subprime classifier model. The method further comprises performing statistical analysis on the recorded results to identify an outlier result corresponding to an outlier subprime classifier model. The method further comprises identifying a outlier feature within the set of features corresponding to the subprime classifier model. The method further comprises removing the identified outlier feature from the set of features to form a modified set of features and training the classifier machine learning model using the label for the target variable and the modified set of features.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Data Leakage is a problem in developing machine learning applications. Data leakage is when information from outside the training dataset is used to create the model. Data Leakage normally happens when some information about a test data dependent variable or target variable is linked to a training set independent variable or feature vectors, thereby artificially inflating the quality of models with unreliable training and testing score accuracy. Data leakage is generally more of a problem with complex datasets, for example time series datasets when creating training and test sets can be difficult, graph problems where random sampling methods can be difficult to construct, and analog observations like sound and images where samples are stored in separate files that have a size and a time stamp. The problem can be detected using manual methods with domain expertise, but while training the models using automated machine learning systems, that is not possible, especially in cases with thousands of feature vectors.

The standard practice followed for supervised machine learning problems is to divide the dataset into a training set and a testing set along with a validation set. Data scientist can then train a model on the training set, check the accuracy on the testing set, and finally validate the model on the validation set before deployment. This framework assumes that all these sets are distinct from each other and, hence, the accuracy results are reliable.

Figure 1A:
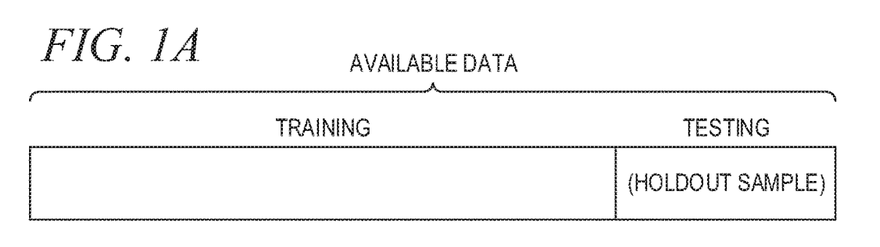
FIG. 1A illustrates a data set divided into a training set and a testing set in accordance with an illustrative embodiment.
Figure 1B:
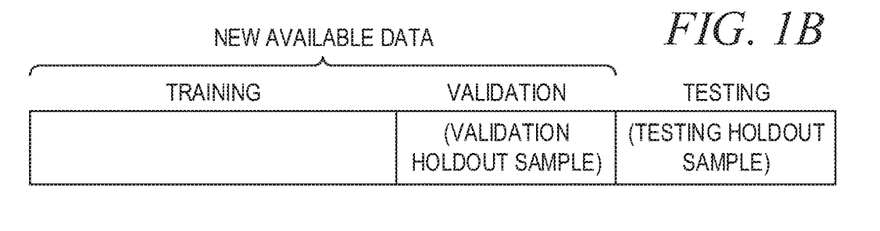
FIG. 1B illustrates a data set divided into a training set, a validation set, and a testing set in accordance with an illustrative embodiment.

FIG. 1A illustrates a data set divided into a training set and a testing set in accordance with an illustrative embodiment. FIG. 1B illustrates a data set divided into a training set, a validation set, and a testing set in accordance with an illustrative embodiment. In a naïve example, if the data is the same between the training set and the test set, then it would render the purpose splitting the dataset useless.

Data Leakage can be broadly defined as the problem in which any information can leak from the training set to the test and validation sets, which renders the results of the model unreliable. Data leakage can also happen for other reasons, such as a relationship between variables (not datasets). Some common causes of data leakage can be application of dimensionality reduction techniques before splitting the dataset, unchecked duplicates in the source system, or some independent variable (y) which has some relationship or information about the target variable or dependent variables (x).

There is an additional complexity added to this problem when an Automated Machine Learning system like AutoAI is used to build the classifier. Unlike a human data scientist who uses domain expertise and domain knowledge for each column to select appropriate features, the AutoAI system relies on metadata, distribution, and representation of the features for feature selection. This mechanism allows AutoAI to build models without user expertise; however, the mechanism also adds additional risk of not validating for data leakage in columns. AutoAI can do feature engineering automatically and then build classifier and tune it using hyperparameter optimization geared towards maximum accuracy. However, if data leakage exists in the system, then any hyperparameter tuning employed by the AutoAI algorithms will be inadequate and misleading.

In most actual applications, the machine learning model may be trained using hundreds or even thousands of features. The names of the features may not be intuitive, and the feature engineering process can contain inadequacies. One way to do machine learning for such complex cases is to use Automated Machine Learning mechanism like AutoAI for the model training. However, if out of thousands of features if one feature has information about the target variable, then Automated Machine Learning would not be able to detect this problem and thereby would fail to address the data leakage. An encoding mechanism (e.g., mean encoding), principal component analysis (PCA), or some other mechanism can cause data leakage, which is difficult to detect.

For example, consider a classification problem that is run on some 10,000 features. The system can be a collection of multiple data sources with each source collected independently and contributing its own set of features. AutoAI can automatically do the feature engineering on the input features and attempt to train the best model for the target. However, it would be very difficult and time consuming to check if data leakage does exist in such cases. Some data leakage like duplicates or dimensionality reduction can be verified a priori, but this is not possible if one of the 10,000 features is linked to the target variable. Correlation analysis by itself is also not always adequate to capture such a relationship as "information" about the target can be coded with explicit correlation. In other cases, the variable may be categorical and not suitable for typical correlation analysis. Any classifier built with such data leakage will show artificially inflated accuracies whereas, in reality, the classifier will be far less accurate.

Thus, a core problem can be defined as follows:

How to detect if there is any data leakage between the training set and the test set before Automated Machine Learning builds the model.

How to isolate the feature vector that is the cause of data leakage. How to determine which one of thousands of variables contains hidden information about the target.

How to build a system that can proactively identify data leakage problem without domain knowledge or user intervention.

The illustrative embodiment presents a mechanism to detect the data leakage problem using one-to-many classification methods for each of the features, mapping the results of each run as a point on a plane, and detecting the problematic feature among a flock. The method can work without human expertise and is scalable across various supervised techniques for Automated Machine Learning (Auto AI). The mechanism of the illustrative embodiment provides a system to prevent data leakage in Automated Machine Learning or AutoAI tools. The mechanism automatically detects data leakage without human supervision. The mechanism is scalable for large numbers of features. The mechanism of the illustrative embodiment uses latent space meta-learning to project each supervised learning model as a point in latent space and to identify data leakage by a statistical model.

The illustrative embodiment builds a classifier between the features of the data set $(X_1, X_2, \ldots, X_n)$ and the variable to be predicted (Y). The illustrative embodiment leaves out Y to detect data leakage and builds classifiers within X that are subprime classifiers. The purpose of these subprime classifiers is to detect data leakage. The illustrative embodiment trains one classifier for every feature in round robin fashion and then converts every classifier model to a point by moving it to a latent space.

In one embodiment, the mechanism calculates an outlier distance using probability distribution, skewness and kurtosis score, and Cook distance. Skewness is a measure of symmetry, or more precisely, the lack of symmetry. A distribution, or data set, is symmetric if it looks the same to the left and right of the center point. Kurtosis is a measure of whether the data are heavy-tailed or light-tailed relative to a normal distribution. That is, data sets with high kurtosis tend to have heavy tails, or outliers. Data sets with low kurtosis tend to have light tails, or lack of outliers. A uniform distribution would be an extreme case. Thus, the mechanism of the illustrative embodiment uses skewness and Kurtosis measures to identify outliers in the models that represent features contributing to data leakage.

In another embodiment, the mechanism fits a meta model regression line on latent space to identify outliers. A meta-regression line plots all the points belonging to subprime classifier models on two-dimensional space and fit the model. Any features that are independent variables (feature vectors) will typically fit into the regression line, while a leaky variable will not fit into the line and can be isolated using regression analysis.

In yet another embodiment, the mechanism uses an anomaly detection and outlier detection method, such as One-class Support Vector Machine (SVM), for finding the data leakage. One-class SVM is an unsupervised algorithm that learns a decision function for novelty detection: classifying new data as similar or different to the training set. The idea of novelty detection is to detect rare events, i.e., events that happen rarely, and hence have very few samples.

The mechanism of the illustrative embodiment then removes features that are flagged as outliers as being features that contribute to data leakage. This effectively prevents data leakage. With these features removed from the training data, the mechanism then uses Automated Machine Learning or AutoAI to build the classifier model.

Before beginning the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
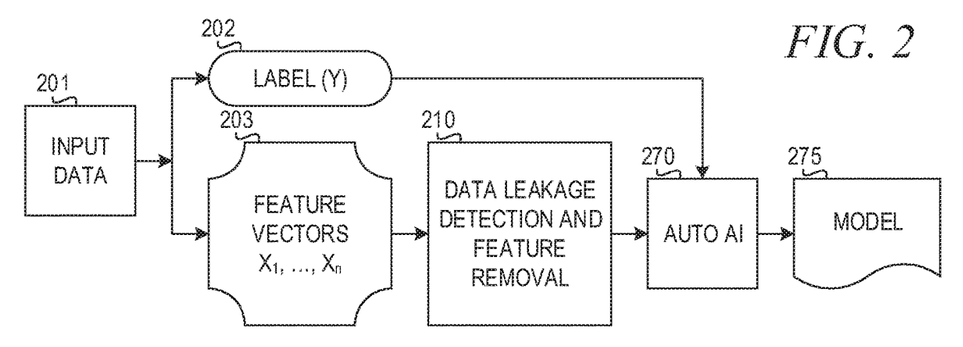
FIG. 2 depicts an automated machine learning system with data leakage detection and feature removal in accordance with an illustrative embodiment.

FIG. 2 depicts an automated machine learning system with data leakage detection and feature removal in accordance with an illustrative embodiment. Input data 201 is divided into a label (Y) 202 to be predicted by the model 275 and the feature vectors $(X_1, \ldots, X_n)$ 203 to be used to train the model. Data leakage detection and feature removal engine 210 identifies features that contribute to data leakage and removes the features from the feature vectors 203 to form a modified training data set. Automated machine learning (AutoAI) engine 270 builds model 275 from the modified training data set and label (Y) 202.

Figure 3:
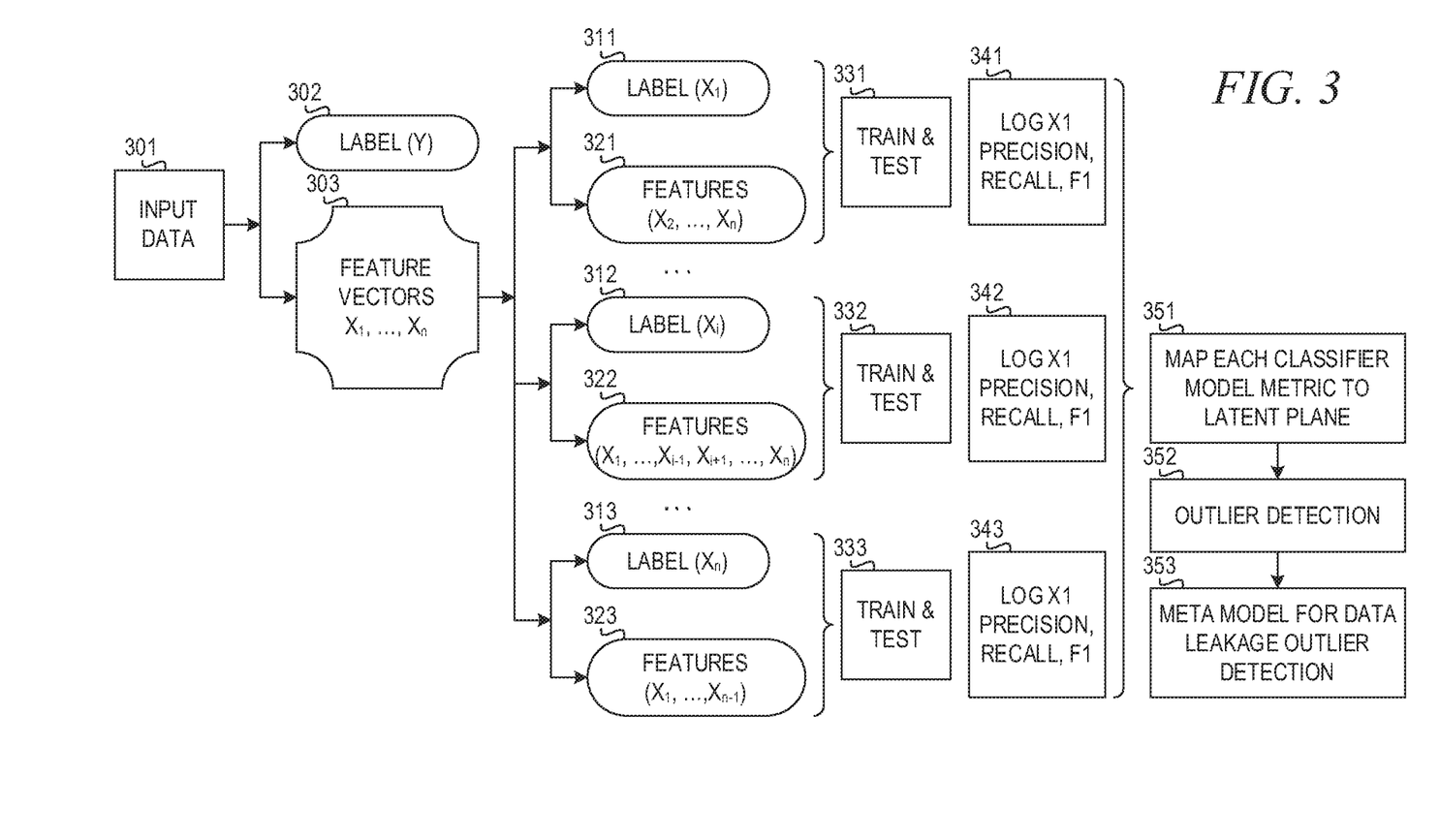
FIG. 3 depicts a data leakage detection and feature removal engine in accordance with an illustrative embodiment.

FIG. 3 depicts a data leakage detection and feature removal engine in accordance with an illustrative embodiment. Input data 301 is divided into a label (Y) 302 to be predicted by the model and the feature vectors $(X_1, \ldots, X_n)$ 303 to be used to train the model. The engine takes all the features 303 as input and excludes the target variable 302 from the set.

Next, the engine excludes a first feature ($X_1$) 311 from the training data and uses the remaining features 321 to train and test a classifier model (block 331). The engine builds the classifier model using one of the feature vectors ($X_1$) 311 as the target variable. In one embodiment, the target variable is chosen randomly, and rest of the features 321 are selected as the independent variables. In an alternative embodiment, the engine takes the features in the order of their columns in the data set. The result of the classifier is logged as output with ROC parameters like precision, recall, F1 score and specificity (block 341).

In statistical analysis of binary classification, the F1 score (also F-score or F-measure) is a measure of a test's accuracy. It considers both the precision p and the recall r of the test to compute the score: p is the number of correct positive results divided by the number of all positive results returned by the classifier, and r is the number of correct positive results divided by the number of all relevant samples (all samples that should have been identified as positive).

Now the engine iterates through every existing feature ($X_i$) 312 without replacement to train and test a classifier in a one-to-many manner (block 332) using the remaining features 322. For every such run the output is logged (block 342). For example, if there are 10,000 feature vectors then the engine will build the model by taking the first column as target and the remaining 9,999 columns as feature vectors. The engine then iterates for all 10,000 models. The engine will eventually exclude a final feature ($X_n$) 313 from the training data set and train and test a model (block 333) using the remaining features 323. The engine logs this final output (block 343).

Figure 4A:
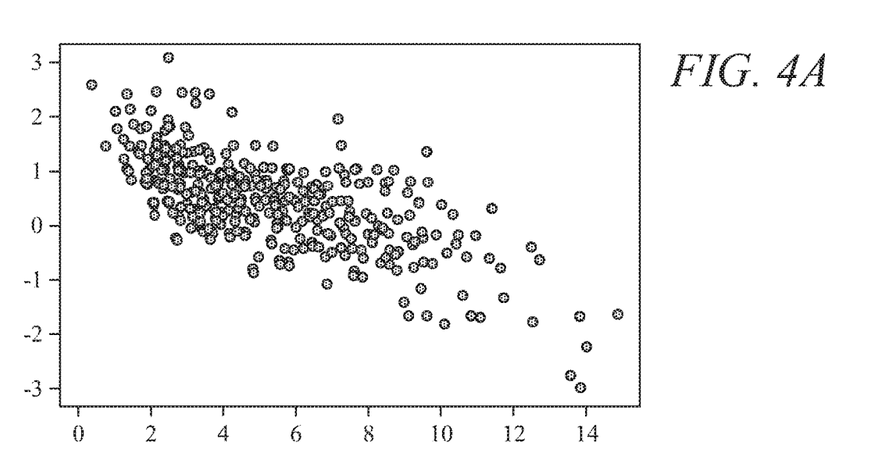
FIG. 4A illustrates the results of all subprime classifiers mapped to a plane in accordance with an illustrative embodiment.

The results of all such subprime classifiers are mapped to a latent plane (block 351). Every point on a plane now represents a model. FIG. 4A illustrates the results of all subprime classifiers mapped to a plane in accordance with an example embodiment. The engine performs a statistical analysis of the meta-distribution of all the subprime models constructed, whereby t stat and p value are calculated as point statistics. The engine calculates a sample mean of ROC metrics like accuracy and other ROC scores. This sample mean is mean of all accuracy scores for every model being constructed. ROC stands for receiver operating char curve. This is a standard metric to assess performance and accuracy of a classifier model. The p-value is defined as the best (largest) probability, under the null hypothesis H about the unknown distribution of the test statistic T, to have observed a value as extreme or more extreme than the value actually observed. In statistics, the t-statistic is the ratio of the departure of the estimated value of a parameter from its hypothesized value to its standard error. It is used in hypothesis testing via Student's t-test. The T-statistic is used in a T test to determine if one should support or reject the null hypothesis.

Figure 4B:
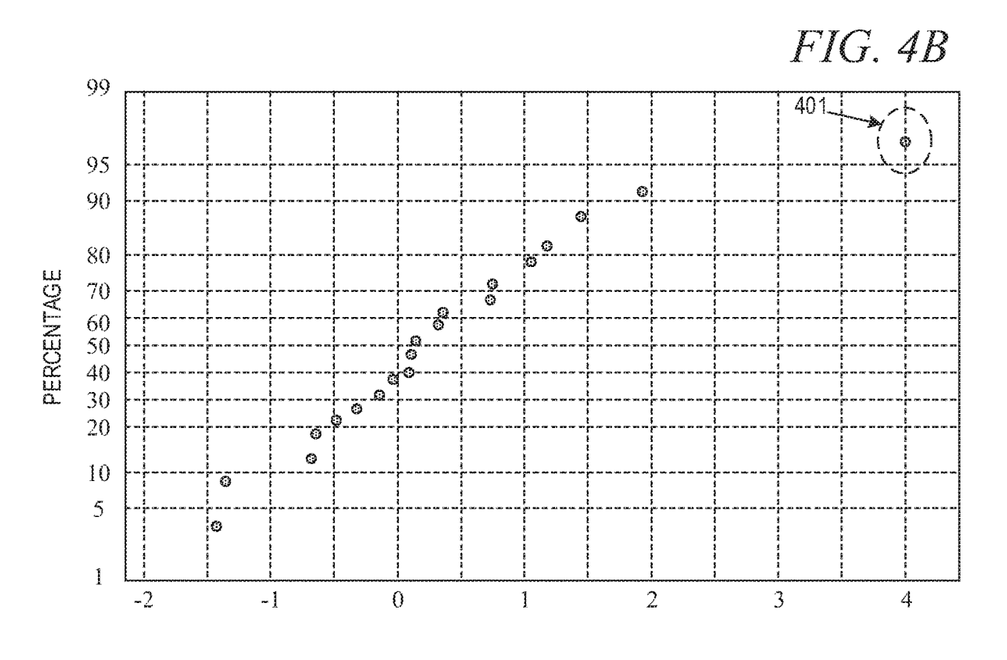
FIG. 4B illustrates outlier detection using Cook or distance methods in accordance with an example embodiment.

Because most of the feature vectors will not contain any information about the target variable, the model distribution analysis results should form a narrow band around a sample mean of accuracy scores. However, one feature that contains information about the target variable would stand out as an outlier away from sample mean. The engine performs outlier detection (block 352) to identify the feature vectors that contribute to data leakage by containing information about the other features. FIG. 4B illustrates outlier detection using Cook or distance methods in accordance with an example embodiment. The engine flags point statistics with such an outlier for data leakage by reverse tracing the point from plane to its original subprime classifier model. FIG. 4B shows the representation of each model as a point, and points 401 and 402 are examples of subprime models with leaky variables being detected. This helps isolate the cause of data leakage in the system.

Figure 4C:
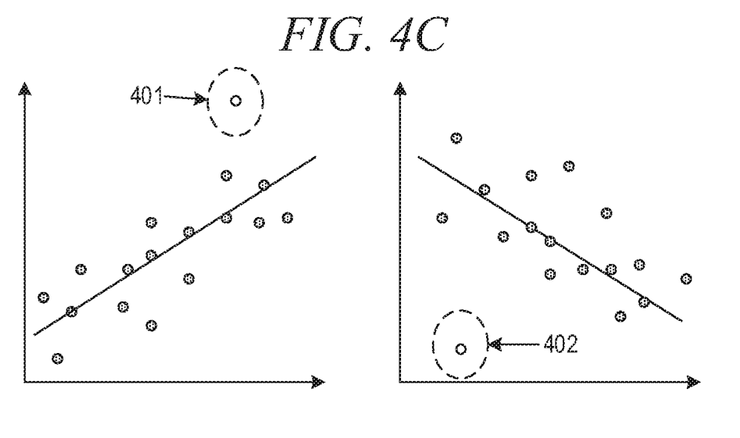
FIG. 4C illustrates a meta model for data leakage outlier detection in accordance with an example embodiment.

Alternatively, the engine provides a meta model for data leakage outlier detection (block 353). FIG. 4C illustrates a meta model for data leakage outlier detection in accordance with an example embodiment. FIG. 4C shows the representation of each model as a point, and points 401 and 402 are examples of subprime models with leaky variables being detected.

Figure 5A:
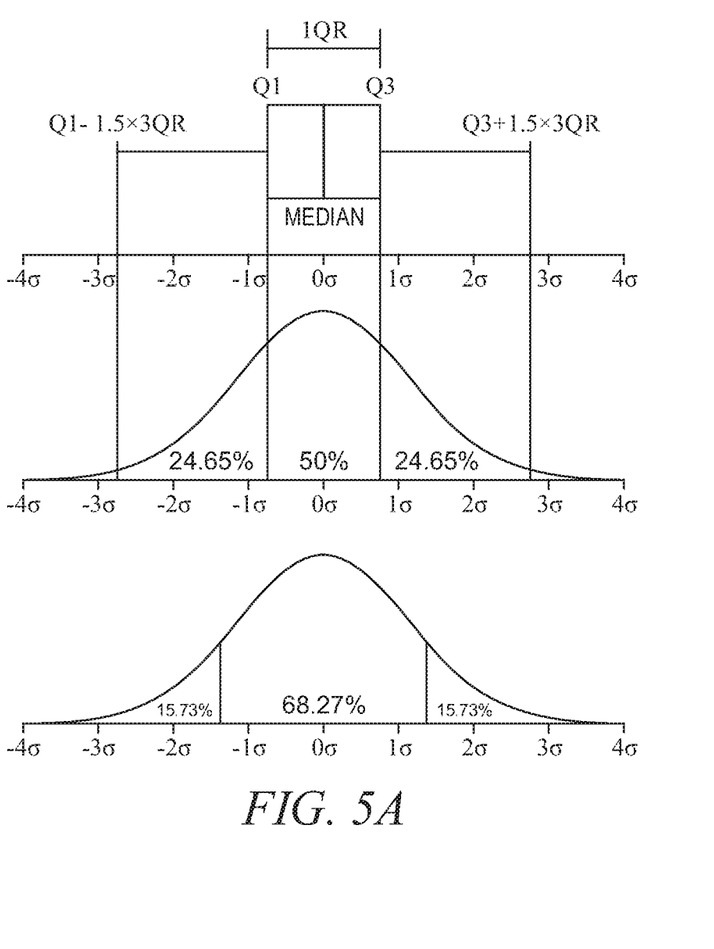
FIG. 5A illustrates the statistical analysis like skewness or Kurtosis method to find the culprit leaky variable in accordance with an example embodiment.

The outlier detection of block 352 is based on statistical analysis, while the outlier detection of block 353 uses machine learning models, such as One-class Support Vector Machine (SVM), to detect outliers. Various embodiments may be deployed to identify the culprit feature that is the cause of data leakage. FIG. 5A illustrates the statistical analysis like skewness or kurtosis method to find the culprit leaky variable in accordance with an example embodiment. It uses Inter Quartile Range (IQR) or Standard Deviation parameters to calculate skewness and kurtosis measures. In probability theory and statistics, skewness is a measure of the asymmetry of the probability distribution of a real-valued random variable about its mean. The skewness value can be positive, zero, negative, or undefined. Kurtosis is a measure of the "tailedness" of a probability distribution of a real-valued random variable. Like skewness, kurtosis describes the shape of a probability distribution and there are different ways of quantifying it for a theoretical distribution and corresponding ways of estimating it from a sample from a population. Different measures of kurtosis may have different interpretations.

Figure 5B:
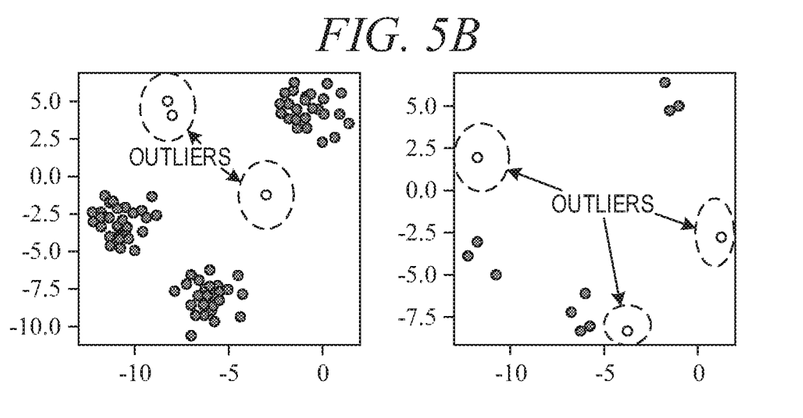
FIG. 5B illustrates outlier detection methods like Cook Distance in accordance with an example embodiment.

FIG. 5B illustrates outlier detection methods like Cook Distance in accordance with an example embodiment. In statistics, Cook's distance or Cook's D is a commonly used estimate of the influence of a data point when performing a least-squares regression analysis. In a practical ordinary least squares analysis, Cook's distance can be used in several ways: to indicate influential data points that are particularly worth checking for validity or to indicate regions of the design space where it would be good to be able to obtain more data points. Data points with large residuals (outliers) and/or high leverage may distort the outcome and accuracy of a regression. Cook's distance measures the effect of deleting a given observation. Points with a large Cook's distance are considered to merit closer examination in the analysis.

Figure 5C:
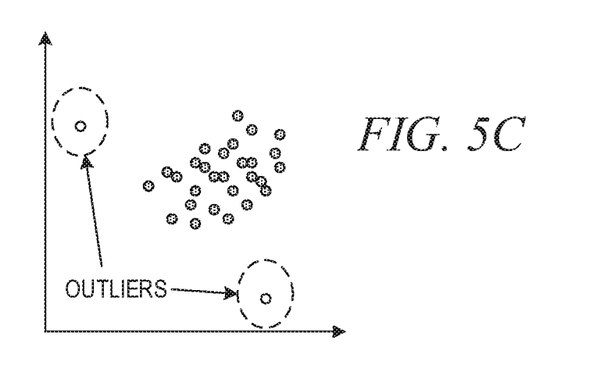
FIG. 5C illustrates using local outlier factor (LOF) algorithm for outlier detection in accordance with an example embodiment.

FIG. 5C illustrates using local outlier factor (LOF) algorithm for outlier detection in accordance with an example embodiment. In anomaly detection, the local outlier factor (LOF) is an algorithm for finding anomalous data points by measuring the local deviation of a given data point with respect to its neighbors.

Figure 5D:
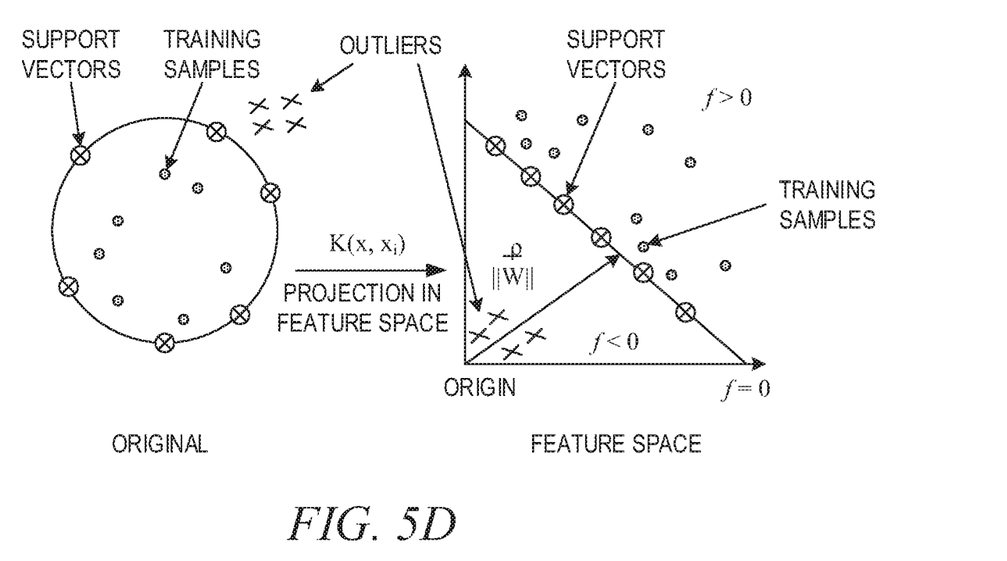
FIG. 5D illustrates outlier detection using one-class support vector machine (SVM) algorithm in accordance with an example embodiment.

FIG. 5D illustrates outlier detection using one-class support vector machine (SVM) algorithm in accordance with an example embodiment. In machine learning, a support-vector machine (SVM) is a supervised learning model with associated learning algorithms that analyzes data used for classification and regression analysis. The Support Vector Machine (SVM) algorithm is a popular machine learning tool that offers solutions for both classification and regression problems. A one-class SVM tries to identify objects of a specific class among all objects, by primarily learning from a training set containing only the objects of that class. In other words, a one-class SVM determines whether each model is like or unlike the other models in its class, i.e., an outlier.

Once an outlier feature is identified, the engine may run the process again on the modified training data set to find a second outlier. This time, there should not be any outlier, and that would confirm that the first identified outlier was responsible for the data leakage. Assuming $X_{out}$ is identified as the feature vector responsible for the data leakage, the mechanism of the illustrative embodiment retrains the model with the original label as the target and the features excluding $X_{out}$ as the training data set using AutoAI. The embodiment of statistical analysis can find only one outlier in a single pass. The alternate embodiments of using machine learning anomaly detection algorithms may be able to find more than one outlier in a single pass.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
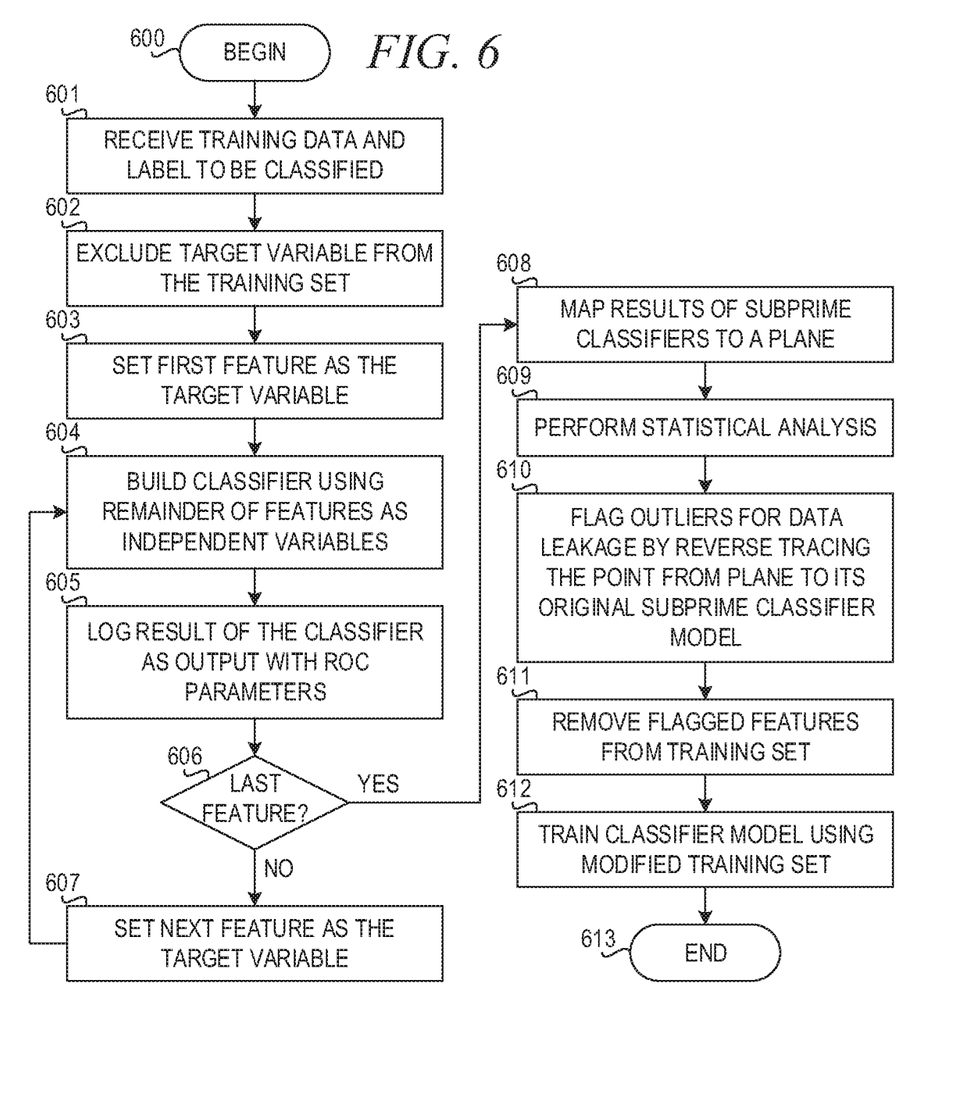
FIG. 6 is a flowchart illustrating operation of a mechanism for preventing data leakage in automated machine learning in accordance with an illustrative embodiment.

FIG. 6 is a flowchart illustrating operation of a mechanism for preventing data leakage in automated machine learning in accordance with an illustrative embodiment. Operation begins (block 600), and the mechanism receives training data and a label to be classified by a model being developed (block 601). The mechanism excludes the target variable from the training set (block 602). Then, the mechanism sets a first feature as the target variable (block 603). The first feature may be the first column of the data set or may be selected at random, for example.

The mechanism builds a classifier using the remainder of the features as independent variables (block 604). The mechanism then logs results of the classifier as output with receiver operating characteristic (ROC) parameters (block 605). An ROC curve is a graph showing the performance of a classification model at all classification thresholds. The mechanism determines whether the feature is the last feature in the data set (block 606). If the feature is not the last feature, then the mechanism sets the next feature as the target variable (block 607), and operation returns to block 604 to build a classifier and log a result.

If the feature is the last feature in block 606, then the mechanism maps the results of subprime classifiers to a plane (block 608). The mechanism performs statistical analysis (block 609) and flags outliers for data leakage by reverse tracing the point from the plane to its original subprime classifier model (block 610). The mechanism removes the flagged features from the training set to form a modified training set (block 611) and trains the classifier model using the modified training set (block 612). Thereafter, operation ends (block 613).

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
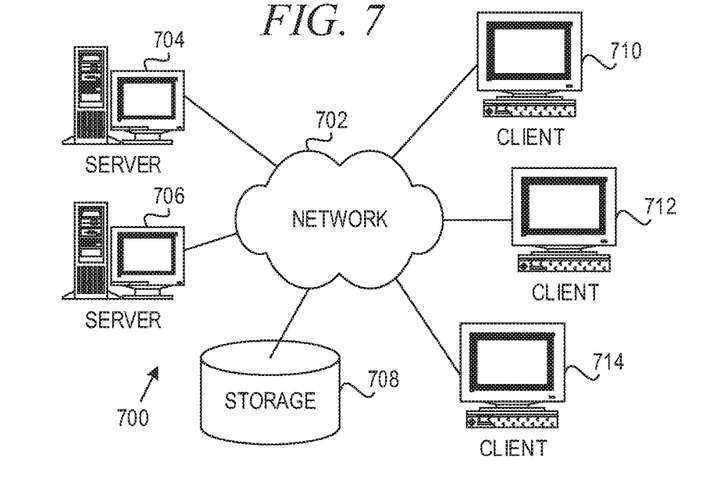
FIG. 7 is an example diagram of a distributed data processing system in which aspects of the illustrative embodiments may be implemented.
Figure 8:
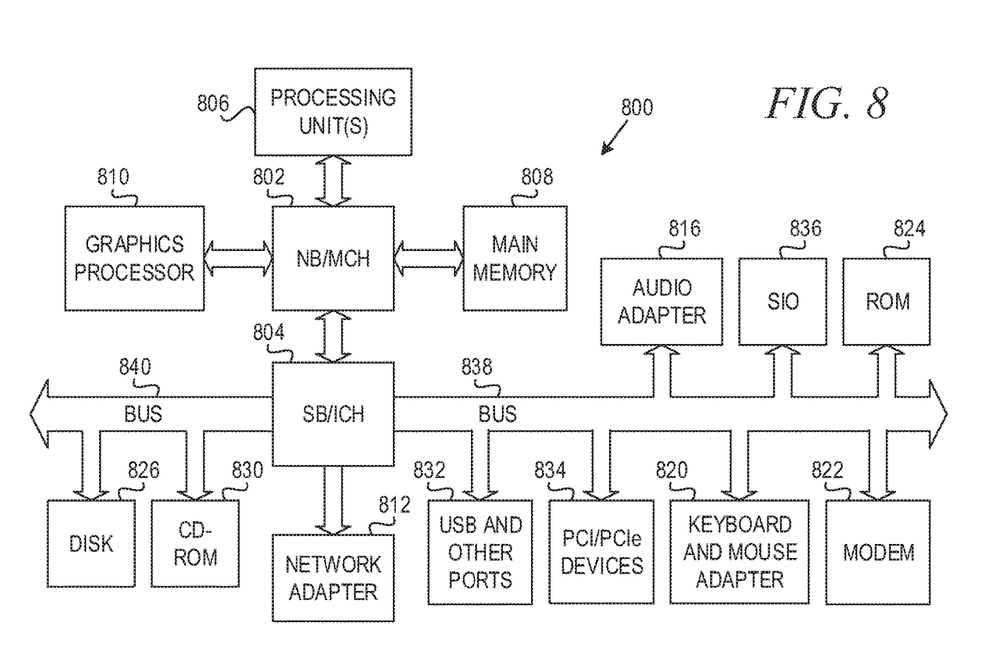
FIG. 8 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 7 and 8 are provided hereafter as example environments in which aspects of the illustrative embodiments may be implemented. It should be appreciated that FIGS. 7 and 8 are only examples and are not intended to assert or imply any limitation with regard to the environments in which aspects or embodiments of the present invention may be implemented. Many modifications to the depicted environments may be made without departing from the spirit and scope of the present invention.

FIG. 7 depicts a pictorial representation of an example distributed data processing system in which aspects of the illustrative embodiments may be implemented. Distributed data processing system 700 may include a network of computers in which aspects of the illustrative embodiments may be implemented. The distributed data processing system 700 contains at least one network 702, which is the medium used to provide communication links between various devices and computers connected together within distributed data processing system 700. The network 702 may include connections, such as wire, wireless communication links, or fiber optic cables.

In the depicted example, server 704 and server 706 are connected to network 702 along with storage unit 708. In addition, clients 710, 712, and 714 are also connected to network 702. These clients 710, 712, and 714 may be, for example, personal computers, network computers, or the like. In the depicted example, server 704 provides data, such as boot files, operating system images, and applications to the clients 710, 712, and 714. Clients 710, 712, and 714 are clients to server 704 in the depicted example. Distributed data processing system 700 may include additional servers, clients, and other devices not shown.

In the depicted example, distributed data processing system 700 is the Internet with network 702 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 700 may also be implemented to include a number of different types of networks, such as for example, an intranet, a local area network (LAN), a wide area network (WAN), or the like. As stated above, FIG. 7 is intended as an example, not as an architectural limitation for different embodiments of the present invention, and therefore, the particular elements shown in FIG. 7 should not be considered limiting with regard to the environments in which the illustrative embodiments of the present invention may be implemented.

As shown in FIG. 7, one or more of the computing devices, e.g., server 104, may be specifically configured to implement a data leakage detection and feature removal engine. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 704, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates preventing data leakage in automated machine learning.

These computing devices, or data processing systems, may comprise various hardware elements which are specifically configured, either through hardware configuration, software configuration, or a combination of hardware and software configuration, to implement one or more of the systems/subsystems described herein. FIG. 8 is a block diagram of just one example data processing system in which aspects of the illustrative embodiments may be implemented. Data processing system 800 is an example of a computer, such as server 704 in FIG. 7, in which computer usable code or instructions implementing the processes and aspects of the illustrative embodiments of the present invention may be located and/or executed so as to achieve the operation, output, and external effects of the illustrative embodiments as described herein.

In the depicted example, data processing system 800 employs a hub architecture including north bridge and memory controller hub (NB/MCH) 802 and south bridge and input/output (I/O) controller hub (SB/ICH) 804. Processing unit 806, main memory 808, and graphics processor 810 are connected to NB/MCH 802. Graphics processor 810 may be connected to NB/MCH 802 through an accelerated graphics port (AGP).

In the depicted example, local area network (LAN) adapter 812 connects to SB/ICH 804. Audio adapter 816, keyboard and mouse adapter 820, modem 822, read only memory (ROM) 824, hard disk drive (HDD) 826, CD-ROM drive 830, universal serial bus (USB) ports and other communication ports 832, and PCI/PCIe devices 834 connect to SB/ICH 804 through bus 838 and bus 840. PCI/PCIe devices may include, for example, Ethernet adapters, add-in cards, and PC cards for notebook computers. PCI uses a card bus controller, while PCIe does not. ROM 824 may be, for example, a flash basic input/output system (BIOS).

HDD 826 and CD-ROM drive 830 connect to SB/ICH 804 through bus 840. HDD 826 and CD-ROM drive 830 may use, for example, an integrated drive electronics (IDE) or serial advanced technology attachment (SATA) interface. Super I/O (SIO) device 836 may be connected to SB/ICH 804.

An operating system runs on processing unit 806. The operating system coordinates and provides control of various components within the data processing system 800 in FIG. 8. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 800.

As a server, data processing system 800 may be, for example, an IBM eServer™ System p® computer system, Power™ processor based computer system, or the like, running the Advanced Interactive Executive (AIX®) operating system or the LINUX® operating system. Data processing system 800 may be a symmetric multiprocessor (SMP) system including a plurality of processors in processing unit 806. Alternatively, a single processor system may be employed.

Instructions for the operating system, the object-oriented programming system, and applications or programs are located on storage devices, such as HDD 826, and may be loaded into main memory 808 for execution by processing unit 806. The processes for illustrative embodiments of the present invention may be performed by processing unit 806 using computer usable program code, which may be located in a memory such as, for example, main memory 808, ROM 824, or in one or more peripheral devices 826 and 830, for example.

A bus system, such as bus 838 or bus 840 as shown in FIG. 8, may be comprised of one or more buses. Of course, the bus system may be implemented using any type of communication fabric or architecture that provides for a transfer of data between different components or devices attached to the fabric or architecture. A communication unit, such as modem 822 or network adapter 812 of FIG. 8, may include one or more devices used to transmit and receive data. A memory may be, for example, main memory 808, ROM 824, or a cache such as found in NB/MCH 802 in FIG. 8.

As mentioned above, in some illustrative embodiments the mechanisms of the illustrative embodiments may be implemented as application specific hardware, firmware, or the like, application software stored in a storage device, such as HDD 826 and loaded into memory, such as main memory 808, for executed by one or more hardware processors, such as processing unit 806, or the like. As such, the computing device shown in FIG. 8 becomes specifically configured to implement the mechanisms of the illustrative embodiments and specifically configured to perform the operations and generate the outputs described hereafter with regard to preventing data leakage in automated machine learning.

Those of ordinary skill in the art will appreciate that the hardware in FIGS. 7 and 8 may vary depending on the implementation. Other internal hardware or peripheral devices, such as flash memory, equivalent non-volatile memory, or optical disk drives and the like, may be used in addition to or in place of the hardware depicted in FIGS. 7 and 8. Also, the processes of the illustrative embodiments may be applied to a multiprocessor data processing system, other than the SMP system mentioned previously, without departing from the spirit and scope of the present invention.

Moreover, the data processing system 800 may take the form of any of a number of different data processing systems including client computing devices, server computing devices, a tablet computer, laptop computer, telephone or other communication device, a personal digital assistant (PDA), or the like. In some illustrative examples, data processing system 800 may be a portable computing device that is configured with flash memory to provide non-volatile memory for storing operating system files and/or user-generated data, for example. Essentially, data processing system 800 may be any known or later developed data processing system without architectural limitation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication-based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for preventing data leakage in automated machine learning, the method comprising:

receiving a data set comprising a label for a target variable for a classifier machine learning model, and a set of input features to be input to the classifier machine learning model;

iteratively selecting an input feature, in the set of input features, as a target variable for training a subprime classifier model, training the subprime classifier model to predict the selected input feature as the target variable, with the other input features within the set of input features being input to the subprime classifier model as independent input features, testing the subprime classifier model, and recording results of the subprime classifier model, wherein for each iteration, a next input feature in the set of input features is selected until a final input feature is selected, thereby generating a plurality of subprime classifier models, one for each selected input feature, and a plurality of corresponding recorded results, one for each subprime classifier model;

performing analysis on the corresponding recorded results of the plurality of subprime classifier models, to identify an outlier result corresponding to an outlier subprime classifier model in the plurality of subprime classifier models;

identifying an outlier feature within the set of input features corresponding to the outlier subprime classifier model, wherein the outlier feature is a feature that has information about the target variable for the classifier machine learning model as indicated from an outlier detection algorithm;

removing the identified outlier feature from the set of input features to form a modified set of input features; and training the classifier machine learning model using the label for the target variable and the modified set of input features.

2. The method of claim 1, wherein the results of the subprime classifier model comprise an accuracy metric indicating an accuracy of the operation of a corresponding subprime classifier model.

3. The method of claim 1, wherein the analysis comprises mapping the results of the subprime classifier model to a plane, wherein each point mapped to the plane represents a subprime classifier model in the plurality of subprime classifier models.

4. The method of claim 1, wherein the analysis comprises plotting a probability distribution of the results of the plurality of subprime classifier models using a distance method.

5. The method of claim 4, wherein the distance method comprises a skewness and Kurtosis method or a Cook distance method.

6. The method of claim 1, wherein the analysis comprises generating a meta model for data leakage detection using a One-class Support Vector Machine (SVM).

7. The method of claim 1, wherein the analysis comprises using an unsupervised machine learning model.

8. The method of claim 1, wherein subprime classifier models are built for the set of input features in a round robin fashion.

9. A computer program product comprising a computer readable storage medium having a computer readable program stored therein, wherein the computer readable program, when executed on a computing device, causes the computing device to:

receive a data set comprising a label for a target variable for a classifier machine learning model, and a set of input features to be input to the classifier machine learning model;

iteratively select an input feature, in the set of input features, as a target variable for training a subprime classifier model, training the subprime classifier model to predict the selected input feature as the target variable, with the other input features within the set of input features being input to the subprime classifier model as independent input features, testing the subprime classifier model, and recording results of the subprime classifier model, wherein for each iteration, a next input feature in the set of input features is selected until a final input feature is selected, thereby generating a plurality of subprime classifier models, one for each selected input feature, and a plurality of corresponding recorded results, one for each subprime classifier model;

perform analysis on the corresponding recorded results of the plurality of subprime classifier models, to identify an outlier result corresponding to an outlier subprime classifier model in the plurality of subprime classifier models;

identify an outlier feature within the set of input features corresponding to the outlier subprime classifier model, wherein the outlier feature is a feature that has information about the target variable for the classifier machine learning model as indicated from an outlier detection algorithm;

remove the identified outlier feature from the set of input features to form a modified set of input features; and train the classifier machine learning model using the label for the target variable and the modified set of input features.

10. The computer program product of claim 9, wherein the results of the subprime classifier model comprise an accuracy metric indicating an accuracy of the operation of a corresponding subprime classifier model.

11. The computer program product of claim 9, wherein the analysis comprises mapping the results of the subprime classifier model to a plane, wherein each point mapped to the plane represents a subprime classifier model in the plurality of subprime classifier models.

12. The computer program product of claim 9, wherein the analysis comprises plotting a probability distribution of the results of the subprime classifier models using a distance method.

13. The computer program product of claim 12, wherein the distance method comprises a skewness and Kurtosis method or a Cook distance method.

14. The computer program product of claim 9, wherein the analysis comprises generating a meta model for data leakage detection using a One-class Support Vector Machine (SVM).

15. An apparatus comprising:
a processor; and
a memory coupled to the processor, wherein the memory comprises instructions which, when executed by the processor, cause the processor to:
receive a data set comprising a label for a target variable for a classifier machine learning model, and a set of input features to be input to the classifier machine learning model;
iteratively select an input feature, in the set of input features, as a target variable for training a subprime classifier model, training the subprime classifier model to predict the selected input feature as the target variable, with the other input features within the set of input features being input to the subprime classifier model as independent input features, testing the subprime classifier model, and recording results of the subprime classifier model, wherein for each iteration, a next input feature in the set of input features is selected until a final input feature is selected, thereby generating a plurality of subprime classifier models, one for each selected input feature, and a plurality of corresponding recorded results, one for each subprime classifier model;
perform analysis on the corresponding recorded results of the plurality of subprime classifier models, to identify an outlier result corresponding to an outlier subprime classifier model in the plurality of subprime classifier models;
identify an outlier feature within the set of input features corresponding to the outlier subprime classifier model, wherein the outlier feature is a feature that has information about the target variable for the classifier machine learning model as indicated from an outlier detection algorithm;
remove the identified outlier feature from the set of input features to form a modified set of input features; and
train the classifier machine learning model using the label for the target variable and the modified set of input features.

16. The apparatus of claim 15, wherein the results of the subprime classifier model comprise an accuracy metric indicating an accuracy of the operation of a corresponding subprime classifier model.

17. The apparatus of claim 15, wherein the analysis comprises mapping the results of the subprime classifier model to a plane, wherein each point mapped to the plane represents a subprime classifier model in the plurality of subprime classifier models.

18. The apparatus of claim 15, wherein the analysis comprises plotting a probability distribution of the results of the subprime classifier models using a distance method.

19. The apparatus of claim 18, wherein the distance method comprises a skewness and Kurtosis method or a Cook distance method.

20. The apparatus of claim 15, wherein the analysis comprises generating a meta model for data leakage detection using a One-class Support Vector Machine (SVM).

* * * * *